(12) United States Patent
Barnes et al.

(10) Patent No.: US 9,152,508 B1
(45) Date of Patent: *Oct. 6, 2015

(54) RESTORATION OF A BACKUP OF A FIRST VOLUME TO A SECOND VOLUME ON PHYSICAL MEDIA

(71) Applicant: STORAGECRAFT TECHNOLOGY CORPORATION, Draper, UT (US)

(72) Inventors: Scott Barnes, Pleasant Grove, UT (US); Nathan S. Bushman, Pleasant Grove, UT (US)

(73) Assignee: STORAGECRAFT TECHNOLOGY CORPORATION, Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/555,348

(22) Filed: Nov. 26, 2014

Related U.S. Application Data

(60) Continuation of application No. 13/481,671, filed on May 25, 2012, now abandoned, which is a division of application No. 12/716,043, filed on Mar. 2, 2010, now Pat. No. 8,190,574.

(51) Int. Cl.
*G06F 11/00* (2006.01)
*G06F 11/14* (2006.01)

(52) U.S. Cl.
CPC .................................. *G06F 11/1469* (2013.01)

(58) Field of Classification Search
CPC ............ G06F 11/2056; G06F 11/1469; G06F 11/1446; G06F 11/1458; G06F 11/1443
See application file for complete search history.

(56) References Cited

U.S. PATENT DOCUMENTS

| | | | |
|---|---|---|---|
| 5,404,508 A | 4/1995 | Konrad et al. | |
| 5,712,970 A | 1/1998 | Arnott et al. | |
| 5,835,953 A | 11/1998 | Ohran | |
| 6,205,558 B1 * | 3/2001 | Sobel | 714/15 |
| 6,253,300 B1 | 6/2001 | Lawrence et al. | |
| 6,615,404 B1 * | 9/2003 | Garfunkel et al. | 717/173 |
| 6,665,815 B1 * | 12/2003 | Goldstein et al. | 714/20 |
| 6,912,630 B1 | 6/2005 | Pillai et al. | |
| 6,938,056 B2 | 8/2005 | Burns et al. | |

(Continued)

FOREIGN PATENT DOCUMENTS

WO 20110109534 9/2011

OTHER PUBLICATIONS

International Search Report and Written Opinion mailed Oct. 31, 2011 in related PCT Application No. PCT/US2011/026889 (3 pgs).

(Continued)

*Primary Examiner* — Philip Guyton
(74) *Attorney, Agent, or Firm* — Maschoff Brennan

(57) ABSTRACT

Restoration of a backup of a first volume to a second volume on physical media. In one example embodiment, a method for restoration of a backup of a first volume to a second volume on physical media includes accessing a volume boot record of the second volume while the volume boot record is in a valid state on the physical media, modifying the volume boot record to place the volume boot record into an invalid state on the physical media, writing data from the backup of the first volume to the inaccessible portion of the data segment of the second volume while the volume boot record is in the invalid state, and restoring the volume boot record to the valid state. In this example embodiment, the invalid state prevents a standard operating system from accessing at least a portion of the data segment of the second volume.

20 Claims, 11 Drawing Sheets

(56) References Cited

U.S. PATENT DOCUMENTS

| | | |
|---|---|---|
| 6,961,838 B2 | 11/2005 | Reuter et al. |
| 7,024,527 B1 | 4/2006 | Ohr |
| 7,069,402 B2 | 6/2006 | Coulter et al. |
| 7,096,379 B2 | 8/2006 | Viswanathan et al. |
| 7,111,136 B2 | 9/2006 | Yamagami |
| 7,120,768 B2 | 10/2006 | Mizuno et al. |
| 7,149,787 B1 | 12/2006 | Mutalik et al. |
| 7,152,079 B2 | 12/2006 | Hirakawa et al. |
| 7,165,154 B2 | 1/2007 | Coombs et al. |
| 7,251,749 B1 | 7/2007 | Fong et al. |
| 7,353,355 B1 | 4/2008 | Tormasov et al. |
| 7,406,473 B1* | 7/2008 | Brassow et al. ............... 1/1 |
| 7,406,743 B2 | 8/2008 | Kim et al. |
| 7,676,689 B1 | 3/2010 | Shioyama et al. |
| 8,190,574 B2* | 5/2012 | Barnes et al. ............ 707/646 |
| 2002/0023225 A1 | 2/2002 | Lomnes |
| 2003/0126107 A1 | 7/2003 | Yamagami |
| 2003/0177149 A1 | 9/2003 | Coombs |
| 2004/0030852 A1 | 2/2004 | Coombs et al. |
| 2004/0163009 A1 | 8/2004 | Goldstein et al. |
| 2005/0240756 A1 | 10/2005 | Mayer |
| 2006/0010314 A1 | 1/2006 | Xu |
| 2006/0064444 A1 | 3/2006 | van Ingen et al. |
| 2006/0106893 A1 | 5/2006 | Daniels et al. |
| 2007/0094533 A1 | 4/2007 | Coombs et al. |
| 2008/0005527 A1 | 1/2008 | Bang |
| 2008/0046781 A1 | 2/2008 | Childs et al. |
| 2008/0155316 A1* | 6/2008 | Pawar et al. .................... 714/8 |
| 2011/0218966 A1* | 9/2011 | Barnes et al. ............. 707/645 |
| 2012/0239624 A1* | 9/2012 | Barnes et al. ............. 707/645 |
| 2013/0238559 A1 | 9/2013 | Bushman |

OTHER PUBLICATIONS

Wikipedia Website https://en.wikipedia.org/wiki/File_Allocation_Table, printed Jul. 23, 2013, (34 pgs).

Notice of allowance mailed Mar. 30, 2012 in U.S. Appl. No. 12/716,043 (15 pgs).

Office Action mailed Feb. 4, 2013 in U.S. Appl. No. 13/481,671 (24 pgs).

Office Action mailed Aug. 1, 2013 in U.S. Appl. No. 13/481,671 (31 pgs).

Office Action mailed Jan. 7, 2014 in U.S. Appl. No. 13/481,671 (30 pgs).

Office Action mailed Aug. 28, 2014 in U.S. Appl. No. 13/481,671 (33 pgs).

Office Action mailed Aug. 30, 2013 in U.S. Appl. No. 13/872,001 (22 pgs).

Office Action mailed Jan. 31, 2014 in U.S. Appl. No. 13/872,001 (25 pgs).

Appeal Brief filed Nov. 24, 2014 in U.S. Appl. No. 13/872,001 (27 pgs).

Examiner's Answer to Appeal mailed Feb. 4, 2015 in U.S. Appl. No. 13/872,001 (8 pgs).

* cited by examiner

RESTORATION OF A BACKUP OF A FIRST VOLUME TO A SECOND VOLUME ON PHYSICAL MEDIA

TECHNICAL FIELD

The present invention relates to restoration of a backup of a first volume to a second volume on physical media.

BACKGROUND

Computers and computer networks face a myriad of threats to the information they contain and to their smooth and continuous operation. Backup systems and methods have been proposed for maintaining snapshots of information on a computer or a computer system at any given time. With a backup, if the computer system experiences some type of corruption of its stored information the state of the computer can be restored to the point in time when the backup was made.

Computer systems typically maintain sets of files that are stored on various forms of computer media. The locations of the blocks of data, on the media that contain the files' data, are stored in special data structures called file system metadata (or simply metadata) and these metadata, combined with the files' own data, are collectively called a file system. The blocks of data for an entire file system are often contained within a logical construct called a volume, which is a collection of media blocks that may span across one or more media devices. Formatting a volume is a process of writing file system metadata structures to blocks on the underlying volume. File systems generally contain a recognizable portion called a signature within their metadata that makes them recognizable, as a file system, to an operating system. When the operating system recognizes a file system on a volume, the operating system may mount the volume to expose the volume's file contents, for use by the system's users and applications. If the operating system cannot recognize the file system on a volume then it will typically indicate that the volume is unformatted, unrecognized, or a combination thereof. When a volume is unrecognized by the operating system, its contents generally cannot be altered by the user (unless they format the volume, rendering it recognizable), or by typical applications.

To protect computer data, various techniques have been developed to backup that data. One common backup technique involves the creation of backup copies of files on a per-file basis. This technique is often simply called file backup. Many backup procedures use the file system as a starting point and perform the backup by writing the files to a backup storage system. Using this approach, individual files are backed up if they have been modified since the previous backup. This file system backup procedure may be useful for finding and restoring a few lost or corrupted files, but it may include significant overhead in the form of bandwidth and logical overhead to store information about where each file exists within the file system. In addition, complete reconstruction of a storage volume may be difficult using incremental file backups because files that have been deleted may be put back on the volume based on the contents of the incremental backups.

Another technique ignores the individual files and instead backs up the blocks of data of the media on which the file system resides. This technique is often called disk image backup (or image backup, or block backup) because the backup file itself generally contains or represents an image, or copy, of the entire contents of the volume (computer users often loosely call their volumes "Disks" despite the fact that an actual physical media disk may contain more than one volume, which is often the case when a hard disk drive contains multiple partitions, each partition hosting a volume) which may be backed up. In fact, with the disk image backup technique, the backup itself is generally called a backup image (or simply image). Because it backs up the blocks on the media underlying the file system, the disk image backup technique backs up both the files' data and the file system metadata. File backup does not generally backup the file system metadata. Because the disk image backup technique backs up media blocks rather than files, this technique does not necessarily need to be aware of the file system structures or the files contained in the file system. However, in practice, many disk image backup systems may utilize minimal knowledge of the file system in order to only backup blocks of data that are actually in use on the media, ignoring unused blocks.

A disk image backup can be relatively fast because the file structure does not need to be examined. Conversely, because there is no coordination with the file system, no file changes can be made during the backup copy. In addition, retrieving files from the backup copy may be difficult or impossible without restoring the entire volume. Finally, while the data transfer may be fast with block copies, every block with valid data must be copied, resulting in a relatively long process for large volumes (e.g., perhaps even days).

If a computer or server crashes or fails, or the software becomes corrupted, it may become necessary to restore the state of the server to some previously backed-up state. Additionally, if a user desires to migrate or upgrade from one server to another server, the new server must be brought up to the same state with the same information as the server to be replaced. Conventionally, the restore process consists of three steps: (1) the machine is usually physically shut down; (2) a backup of the latest data is created; and (3) the data is copied from the backup storage to the storage of the new server (e.g., a disk drive used by the server). During this operation, a dedicated boot procedure can be used (for example, boot from a floppy disk); and (4) the new server is started.

Between the shutdown and start time, neither server performs any useful functions. Also, the process of restoring all the files of the server is time consuming. In corporate networks, a typical server can have many Terabytes of data. With current data transfer rates over networks and from disks, restoring this much data may take hours, or even days.

Also, even an hour of downtime may be considered an extremely long time, particularly for many mission-critical applications. For example, if the server in question is a web server that handles customer requests or sales, a period of 16-20 minutes of downtime can result in substantial lost sales.

Systems and methods are needed for an effective backup strategy that is flexible in maintaining multiple, accurate backup states, and reducing a downtime when both a backup computer and a restore computer are not operational.

BRIEF SUMMARY

In general, embodiments of the present invention relate to restoration of a backup of a first volume to a second volume on physical media. At least some example embodiments provide an effective backup and restore strategy that is flexible in maintaining multiple backup states and can perform a restore process while the backup process is underway and reduce a downtime in which both a first volume and a second volume are not operational.

In one example embodiment, a method for restoration of a backup of a first volume to a second volume on physical media includes accessing a volume boot record of the second volume while the volume boot record is in a valid state on the physical media, modifying the volume boot record to place the volume boot record into an invalid state on the physical media, writing data from the backup of the first volume to the inaccessible portion of the data segment of the second volume while the volume boot record is in the invalid state, and restoring the volume boot record to the valid state. In this example embodiment, the valid state enables a standard operating system to access a data segment of the second volume and the invalid state prevents the standard operating system from accessing at least a portion of the data segment of the second volume.

DETAILED DESCRIPTION

Figure 1:
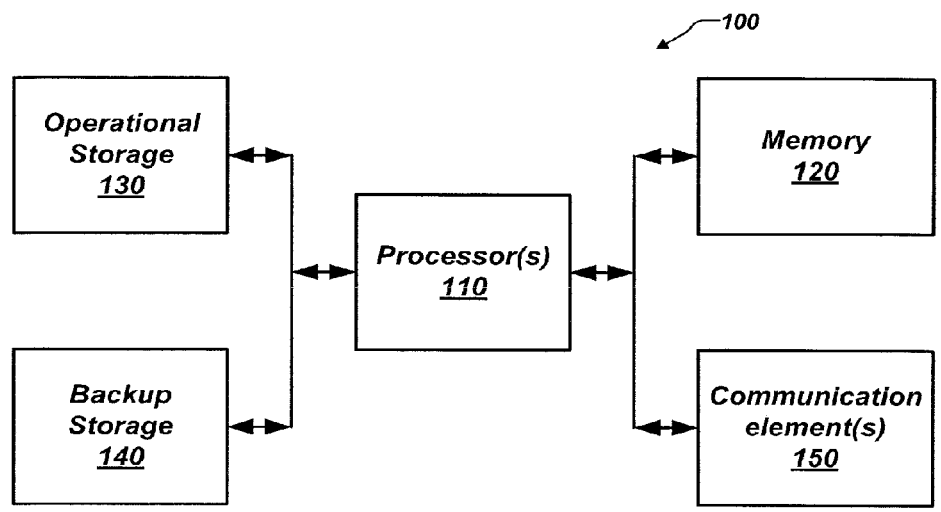
FIG. 1 illustrates a simplified example of a computing system for practicing embodiments of the present invention.

In the following description, elements, circuits, and functions may be shown in block diagram form in order not to obscure the present invention in unnecessary detail. Conversely, specific implementations shown and described are exemplary only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations, and the like, have been omitted where such details are not necessary to obtain a complete understanding of the present invention and are within the abilities of persons of ordinary skill in the relevant art.

Furthermore, in this description of embodiments of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is not to be taken in a limiting sense, and the scope of the present invention is defined only by the appended claims.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

Those of skill would further appreciate that the various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and steps are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the invention described herein.

The various illustrative logical blocks, modules, and circuits described in connection with the embodiments disclosed herein may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Also, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Embodiments of the present invention include methods, computing systems, and computer-readable media, for providing an effective backup and restore strategy that is flexible in maintaining multiple backup states and can perform a restore process while the backup process is underway and reduce a downtime when both a backup computer and a restore computer are not operational.

The term "boot record" as used herein means metadata on a storage medium that makes the storage medium recognizable to an operating system as a storage medium that contains a file structure accessible by file system software. If the boot record contains valid information about the file structure, then an operating system can recognize and expose the file structure. This exposure of the file structure contained on a volume's storage medium is called "mounting," and it is this mounting process that enables users and applications to utilize the files stored on the storage medium using file system software. Thus, as a non-limiting example, a Volume Boot Record (VBR) is a boot record on a volume that makes the volume recognizable by an operating system as containing a file structure.

The term "private block access" as used herein means accessing block storage medium through a private Input/Output (IO) interface configured for block accesses that is available to embodiments of the present invention, but is not generally available to applications or general operating system processes. Similarly, a private block access process is a process that uses one or more private block accesses to perform IO operations to the block storage medium.

The term "public block access" as used herein means accessing block storage medium through an IO interface configured for direct block access to the block storage medium that is exposed to applications and operating system processes.

The term "block access" as used herein means a private block access or a public block access.

The term "file access" as used herein means accessing block storage medium through a file system that translates a file access request from applications or general operating system processes to one or more public block accesses.

Embodiments of the present invention deal with disk image backup techniques. Therefore, unless specified otherwise, references to backup imply backup using a disk image backup technique.

One challenge faced by backup systems is the need to be able to capture the state of the data for all of the blocks on a volume at a given moment, without locking or interrupting access to the volume by applications and users, despite the fact that the volume may be in use and changes may be in the process of being written to the volume. Techniques to expose such a volume state (often called a snapshot state or simply a snapshot), without affecting the usability of the volume itself, may be referred to as volume snapshot or volume shadow copy techniques. Both of these backup techniques often leverage snapshot technology in order to backup data on in-use volumes without interrupting users and applications.

Another challenge faced by backup systems is the need to make periodic backups in order to capture any changes since prior backups. The first time a volume is backed up, the resulting backup is typically a file called a full backup image, which contains all (or all in-use) blocks on the volume at the time the backup was created. When the next backup of the volume occurs, only the blocks of data on the volume that have changed since the prior backup need to be saved. Such a backup is typically called an incremental backup and results in a file called an incremental backup image, which contains just those blocks that have changed since the prior backup. A first incremental backup, combined with the prior full backup, contain all of the data for the blocks on the volume at the time that the first incremental was created. The first incremental file is therefore only useful if the full image file is also available. In other words, the first incremental file is dependent upon the full image file. Subsequent backups may also be incremental backups, each containing just the data for the blocks that were changed since the prior backup, and each subsequent incremental image file is dependent upon the incremental image file for the prior backup. A full image file, and all of the incremental image files which depend upon it, can be called a "backup image file chain" (or simply a "chain"). Each image file in the chain, combined with the image files upon which it depends, represents the state of the backed up volume's data at a specific point-in-time, and therefore sometimes each image file in the chain is called a "point-in-time" or a "recovery point." Mechanisms may be used to enable backup systems to actively track the blocks which change between backups, such that the creation of incremental backups does not require a time-consuming comparison of the current state of the volume with a prior state, but rather a list of the changed blocks is available and is used to determine which blocks are to be saved in the incremental image file. This list makes it possible for such periodic incremental backups to be efficient with both time, and storage space.

With contemporary image backup systems, when restoring a backup image file, that image file, and all of the image files upon which it depends, must be utilized (read from) in order to restore the target volume to a state where it contains the same set of blocks as were contained by the source volume at the time the backup was created. In scenarios where the backup contains many billions or even trillions of bytes of data, restoring all of that data to the target volume can take an inordinate amount of time, potentially many days.

If the source volume of a backup image chain contains a recognized file system, then typically when a point-in-time in an image chain is restored to a target volume, the operating system will recognize the data on the target volume as being a recognized file system, and will mount that file system. The mounting is the exposure of the file system's file contents for use by applications and users. When the operating system mounts a file system, the process of mounting alone can results in changes being written to the volume, such as writes to various logs and file system journaling structures on the volume. Also, once mounted by the operating system, the volume's contents can be easily altered by users and applications. When any such writes occur, the state of the target volume's data no longer exactly reflects the state of the point-in-time data that was restored to the target volume. If the image chain, which was utilized for the restore, contained points-in-time that are chronologically younger or newer than the point-in-time which was actually restored, then it is not typically possible to subsequently restore a younger point-in-time in the same chain to the same target restore volume, after it has been mounted by the operating system and altered by writes, without losing the data for those writes which occurred after the mount. In other words, when a point-in-time has been restored to a target volume and the target volume has been mounted by the operating system, typically it is not possible to then restore additional points-in-time from the same chain to that restore target volume without the risk of losing data.

If a volume fails, ideally the data for that volume's backup's most-recent point-in-time is made available with minimal downtime between the volume failure and the exposure of the last point-in-time's data for use by users and applications. Because new point-in-time backups are generally being created for the source volume up until the time that the source volume becomes unavailable (due to failure, etc.), to restore the latest point-in-time backup conventional image backup systems cannot even begin their restore operation until the source volume has actually become unavailable, at which point they can choose the most-recent point-in-time as only then is it determined to actually be the most-recent point-in-time. Conventional image backup systems are not able to restore, in advance, some of the points-in-time, while the source volume may still be available, and then later as a separate restore operation (perhaps separated in time by a system reboot). Subsequent points-in-time in the same chain cannot be restored without risking corruption in between such operations due to the exposure, by the operating system, of the volume's file system content.

This limitation has made it difficult to preemptively prepare a standby restore volume with the contents of the last point-in-time that was backed up from the source volume prior to the source volume becoming inaccessible (due to failure or other events).

When a mission-critical computer system has failed, the costs of downtime while a restore is being performed with conventional backup systems to a replacement system can be immense. Even one hour of lost sales due to a failed web server can result in substantial losses. With terabytes of data, the downtime can extend to days.

FIG. 1 illustrates a computing system 100 for practicing embodiments of the present invention. The computing system 100 may be a user-type computer, a file server, a compute server, or other similar computer including data storage capability. Computer, computing system, and server are used interchangeably herein to indicate a system for practicing embodiments of the present invention. The computing system 100 is configured for executing software programs containing computing instructions and includes one or more processors 110, memory 120, one or more communication elements 150, operational storage 130, and backup storage 140.

The one or more processors 110 may be configured for executing a wide variety of operating systems and applications including the computing instructions for carrying out embodiments of the present invention.

The memory 120 may be used to hold computing instructions, data, and other information for performing a wide variety of tasks including performing embodiments of the present invention. By way of example and not limitation, the memory may include Synchronous Random Access Memory (SRAM), Dynamic RAM (DRAM), Read-Only Memory (ROM), Flash memory, and the like.

The communication elements 150 may be configured for communicating with other devices or communication networks. By way of example, and not limitation, the communication elements 150 may include elements for communicating on wired and wireless communication media, such as, for example, serial ports, parallel ports, Ethernet connections, universal serial bus (USB) connections, IEEE 1394 ("firewire") connections, BLUETOOTH® wireless connections, 802.1 a/b/g/n type wireless connections, and other suitable communication interfaces and protocols.

The operational storage 130 and backup storage 140 may be used for storing large amounts of non-volatile information for use in the computing system 100. The operational storage 130 and backup storage 140 may be configured as one or more storage devices. By way of example and not limitation, these storage devices may include computer-readable media (CRM). This CRM may include, but is not limited to, magnetic and optical storage devices such as disk drives, magnetic tapes, CDs (compact disks), DVDs (digital versatile discs or digital video discs), and other equivalent storage devices. Furthermore, the storage devices may include Redundant Array of Independent Disks (RAIDS) storage systems.

While illustrated as two discrete blocks in FIG. 1, those of ordinary skill in the art will recognize that the operational storage 130 and backup storage 140 may actually be resident on the same mass storage device such that a portion of the mass storage device contains operational information for storing software and data used by the computing system 100 and a portion of the mass storage device includes backup information. Furthermore, the operational storage 130 may span multiple devices and the backup storage 140 may span multiple devices.

Software processes illustrated herein are intended to illustrate representative processes that may be performed by the systems illustrated herein. Unless specified otherwise, the order in which the process acts are described is not intended to be construed as a limitation, and acts described as occurring sequentially may occur in a different sequence, or in one or more parallel process streams. It will be appreciated by those of ordinary skill in the art that many steps and processes may occur in addition to those outlined in the flow charts. Furthermore, the processes may be implemented in any suitable hardware, software, firmware, or combinations thereof.

When executed as firmware or software, the instructions for performing the processes may be stored on a computer-readable medium. A computer-readable medium includes, but is not limited to, magnetic and optical storage devices such as disk drives, magnetic tape, CDs (compact disks), DVDs (digital versatile discs or digital video discs), and semiconductor devices such as RAM, DRAM, ROM, EPROM, and Flash memory.

By way of non-limiting example, computing instructions for performing the processes may be stored on the operational storage 130, transferred to the memory 120 for execution, and executed by the processor 110. The processor 110, when executing computing instructions configured for performing the processes, constitutes structure for performing the processes. In addition, some or all portions of the processes may be performed by hardware specifically configured for carrying out the processes.

While some of the discussion herein may be directed toward MICROSOFT® operating systems such as WINDOWS NT® and WINDOWS XP®, the present invention is not so limited and is applicable to many operating systems. In addition, the discussion may relate to managing file and directory structures on storage volumes. Generally, file movements are referred to as read accesses and write accesses. It will be understood by those of ordinary skill in the art that other file accesses are possible within the scope of the invention, such as, for example, changing dates on a file, changing privileges on a file, and changing other file status indicators. Furthermore, the discussion generally refers to files. However, unless specified otherwise, references to files may include files, directories, and other similar data structures associated with mass storage devices. A volume may include a variety of mass storage devices, such as, by way of example and not limitation, hard disk drives, flash drives, floppy disks, digital cameras, music players, and similar devices.

Figure 2:
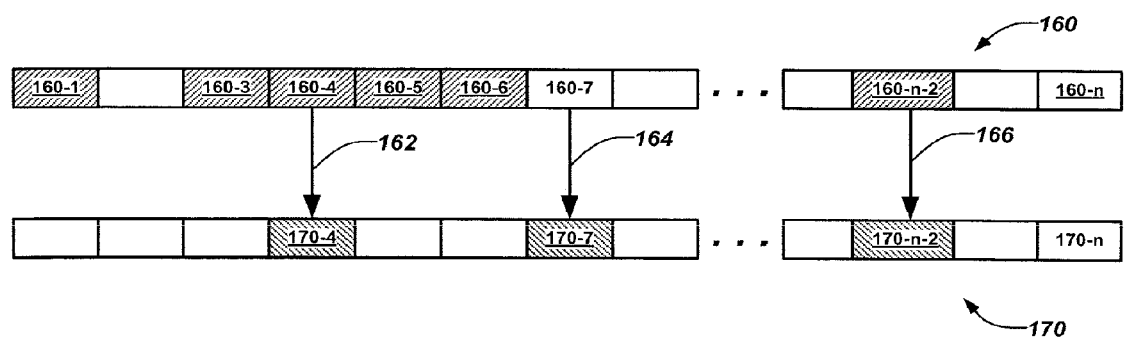
FIG. 2 illustrates segmenting of a target volume and incremental backups of portions of the target volume.

FIG. 2 illustrates partitioning of a target volume 160 and a shadowed incremental backup 170 of portions of the target volume 160. In the embodiment of FIG. 2, the target volume 160 is partitioned as a physical (i.e., sector) layout of the disk or volume with sectors 160-1 through 160-n. The shaded sectors illustrate sectors that include information stored thereon at a given point in time. The shadowed incremental backup 170 is a storage area that tracks (i.e., shadows) and includes changes in the information stored on the target volume 160 after the given point in time. Thus, at time t0, the target volume 160 includes data at sectors 160-1, 160-3 through 160-6, and 160-n-2. Also at time t0, the shadowed incremental backup 170 does not include any information.

As time progresses after time t0, changes may occur to specific sectors on the target volume 160. With incremental sector-type backup systems, when information within a sector is modified, the incremental backup 170 is written to include the same information as a corresponding sector on the target volume 160. As an example, if information within a file at sector 160-4 is modified, the incremental backup process creates a copy 162 of the entire sector as structure 170-4 on the incremental backup 170 including the change to the information within the file in question. If additional changes are made to information within sector 160-4, the same changes are made to structure 170-4 on the incremental backup 170.

As another example, perhaps a new file is created and placed in sector 160-n-2. The incremental backup process will copy 166 the contents of the 160-n-2 sector to structure 170-n-2 of the incremental backup 170. Any subsequent changes to information in sector 160-n-2 will also be made to structure 170-n-2 of the incremental backup 170.

As another example, perhaps information is added to previously empty segment 160-7 on the target volume 160. The incremental backup process will add 164 the same information to structure 170-7 of the incremental backup 170. Any subsequent changes to information in sector 160-7 will also be made to structure 170-7 of the incremental backup 170.

For ease of discussion, the incremental backup 170 is illustrated as structures (e.g., 170-4, 170-7, 170-n-2) of the incremental backup 170 corresponding to the sectors (e.g., 160-4, 160-7, 160-n-2) of the target volume 160. However, while the structures of the incremental backup 170 will have the same data size as the sectors of the target volume 160, the structures do not need to be configured on sector boundaries, be contiguous, or be in the same relative location as the target volume 160. Thus, a structure, such as, for example, structure 170-4 may include information at various locations within the incremental backup 170 and may be stored at any location within the incremental backup 170. In other words, FIG. 2 illustrates a physical arrangement of the target volume 160, but only a logical arrangement of the incremental backup 170.

With this sector backup process, sectors may contain a variety of information, such as, for example, files, portions of files, and metadata such as directory structures and file pointers. In addition, it does not matter how many times information in a sector changes, only the last result at the time that an incremental backup is created and is stored. Thus, if incremental backups use a shadowing process, the shadow copy keeps a coherent image of the changes that are made to the volume as the changes are made. Then, to create an incremental backup, a time point is defined. The shadow copy is saved as the incremental backup at that time point and a new shadow copy is created showing no changes, but ready to be modified with changes that occur after the time point.

Figure 3:
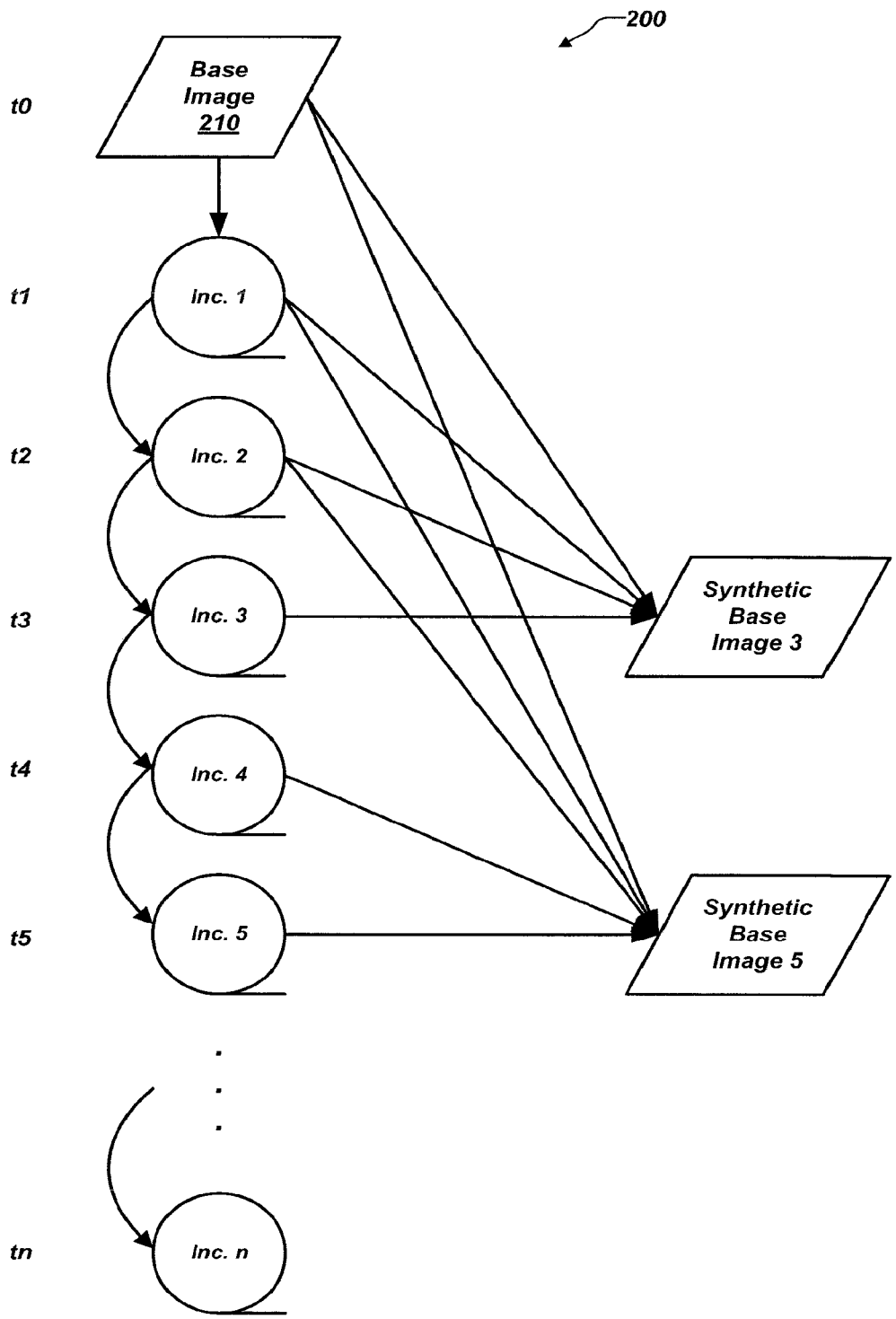
FIG. 3 is a simplified flow diagram illustrating backup procedures for creating synthetic base backups of a target volume.

FIG. 3 is a flow diagram 200 illustrating backup procedures for creating synthetic base backups of a target volume. First, a base image 210 is created at time t0. This base image is a backup of the entire volume. As stated earlier, a base image 210 may be very large depending on the size of the volume being backed up and the amount of information on the volume at the time the base image 210 is made. As a result, a base image may take a relatively long time to create and consume considerable storage space.

After the base image 210 has been created, incremental images may be created. As shown in FIG. 2, an incremental image includes changes to a volume that occur after a specific point in time. Thus, incremental backup 1 includes all sectors that have changes after time t0 and up to the time t1 of incremental backup 1.

Similarly, incremental backup 2 includes all changes made to sectors of the volume after the point in time that incremental backup 1 was created and up to the time t2 of incremental backup 2. The process of creating incremental backups may be repeated indefinitely, up to incremental backup N.

FIG. 3 illustrates additional incremental backups 3, 4, 5, and up to N in a backup procedure 200. These incremental backups are sector based. As a result, to restore any given file, or the entire volume, a restoration process must take into account the most recent incremental backup, the base image 210, and all intervening incremental backups. Of course, a sector may have changed for each incremental backup. Thus, only the most recent backup includes the most recent information for that sector. For example, to get a true picture of the volume at time t4, the restoration process would take into account: the base image 210; changes made between time t1 and t0 and reflected in incremental backup 1; changes made between time t2 and t1 and reflected in incremental backup 2; changes made between time t2 and t3 and reflected in incremental backup 3; and changes made between time t4 and t3 and reflected in incremental backup 4.

Consequently, one of the problems with creating long backup chains is that the base image 210 must be combined with a large number of intervening incremental backups to get a true picture of the volume. As a non-limiting example, suppose a base-image is created on a first day. Then each subsequent day, two incremental backups are made at different times. After a couple of weeks, there would be 28 or more incremental backups that would need to be combined with the base image 210 to create a full picture of the target volume after those 14 days.

On the other hand, because of the large size of a base image and the relatively long time to create a base image, creating base images more often also may be difficult. In addition, for security and redundancy reasons, many organizations maintain a copy of backups at remote sites. With remote site storage, the target volume can still be recovered if the base image or the incremental backup images are removed from the local site. For example, backup information at local sites may be removed periodically to allow for more storage space at the local site. In addition, a hardware or software failure may corrupt data on the local volume or otherwise prevent access to the local data. In these cases, the backup information can be retrieved from the remote site to restore the state of the local volume.

Thus, a balance must be struck between the time, storage, and communication issues associated with a base image relative to the processing time associated with long incremental backup chains.

Embodiments of the present invention can reduce the length of the incremental backup chain by creating synthetic base images. As a non-limiting example, in FIG. 3 synthetic base image 3 may be created by combining all the information from base image 210, incremental backup 1, incremental backup 2, and incremental backup 3. Thus, synthetic base image 3 becomes a complete base image at time t3. Now, to get a true picture of the volume at time t4, the restoration process could use synthetic base image 3 as a starting point rather than the base image 210. As a result, a true picture of the target volume at time t4 may be obtained by combining synthetic base image 3, with the changes made between time t4 and t3 that are reflected in incremental backup 4.

Similar to synthetic base image 3, synthetic base image 5 may be created by combining the base image 210 with all of the incremental backups 1-5. As a result, synthetic base image 5 represents a base image (e.g., a full backup) at time t5. While not illustrated in FIG. 3, those of ordinary skill in the art will recognize that synthetic base image 5 also may be created by combining the information from synthetic base image 3 with incremental backup 4 and incremental backup 5. In the end, synthetic base image 5 should contain the same information through either combination process.

Figure 4:
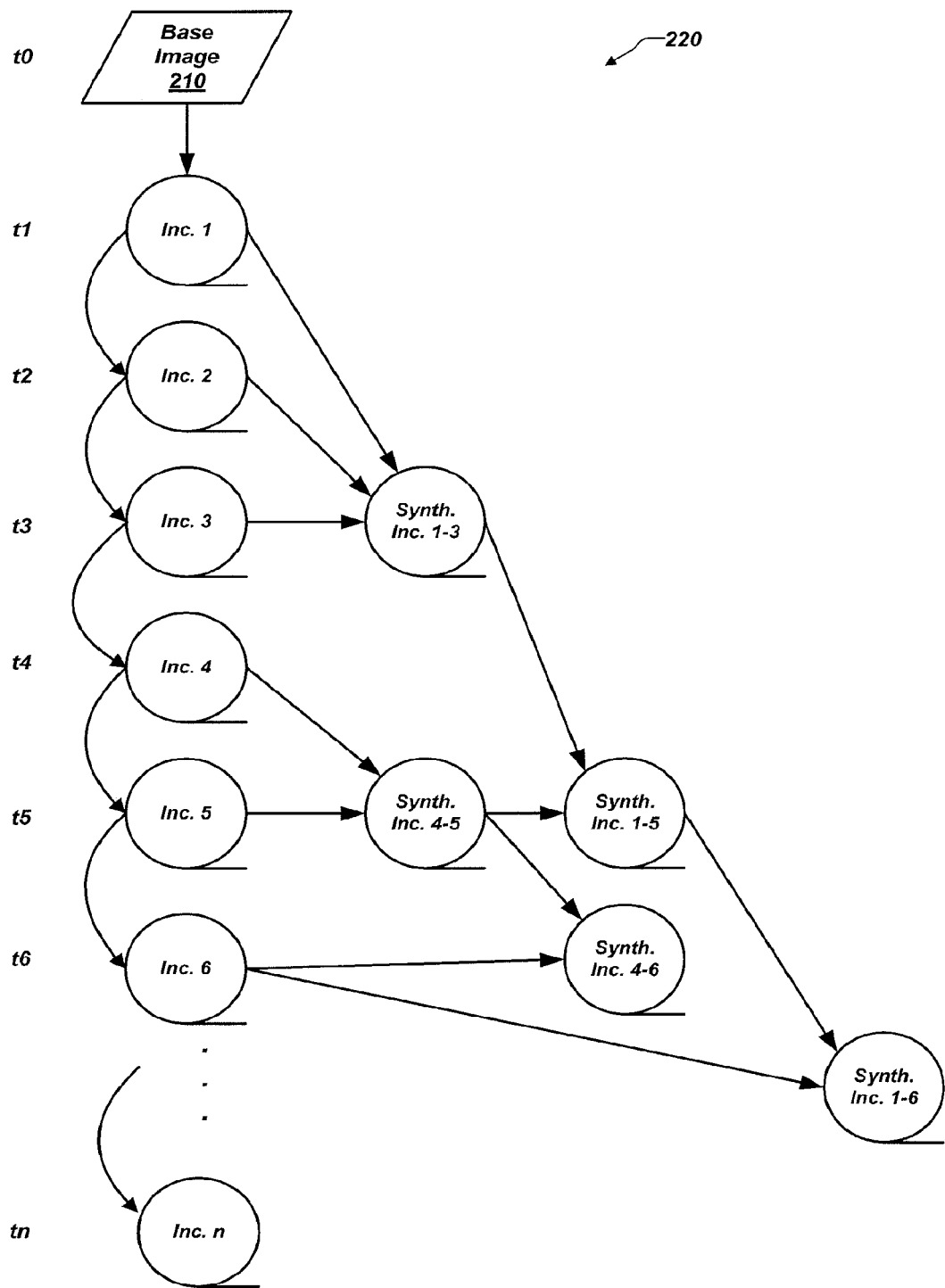
FIG. 4 is a simplified flow diagram illustrating backup procedures for creating synthetic incremental backups of a target volume.

FIG. 4 is a flow diagram illustrating backup procedures 220 for creating synthetic incremental backups (also referred to as differential backups) of a target volume. Another way to reduce the length of chains of incremental backups is to create synthetic incremental backups at intermediate stages in the chain. As with FIG. 3, FIG. 4 includes base image 210, incremental backups 1-6, and up to incremental backup N at times t0 through tN. In a manner similar to the process for creating a synthetic base image, a synthetic incremental backup may be created by combining one or more contiguous incremental backups.

As a non-limiting example, synthetic incremental backup 1-3 may be created by reflecting all the changes made between incremental backup 1 and incremental backup 3. Thus, incremental backup 1, incremental backup 2, and incremental backup 3 are combined to create synthetic incremental backup 1-3. Similarly, synthetic incremental backup 4-5 may be created by combining the information from incremental backup 4 and incremental backup 5.

Many combinations are possible for creating synthetic incremental backups. Furthermore, synthetic incremental backups may be used to create other synthetic incremental backups. As non-limiting examples, synthetic incremental backup 1-5 may be created by combining the information from synthetic incremental backup 1-3 and synthetic incremental backup 4-5.

As additional non-limiting examples, synthetic incremental backups may be combined with individual incremental backups. In FIG. 4, synthetic incremental backup 4-6 may be created by combining the information from synthetic incremental backup 4-5 and incremental backup 6. Thus, synthetic incremental backup 4-6 includes all the information on changes made to the volume between times t4 and t6. Similarly, synthetic incremental backup 1-6 may be created by combining the information from synthetic incremental backup 1-5 and incremental backup 6.

With synthetic incremental backups created, the backup and restoration process may be configured to delete intermediate incremental backups or may keep the intermediate incremental backups. For example, with synthetic incremental backup 1-3 created, incremental backups 1 through 3 could be deleted. However, if they are deleted, some time granularity may be lost. In other words, if information is to be restored, information could be obtained at time t3 or at time t0, but information at times t1 and t2 is no longer available.

On the other hand, if the original incremental backups are retained along with the synthetic incremental backups, full time granularity can be maintained, and the incremental chain used to restore information at a point in time can also be reduced.

As a non-limiting example, if information is to be restored for time t6, a number of optional chains are available based on the synthetic incremental backups created in FIG. 4. One chain could be using base image 210 in combination with incremental backups 1-6. Another chain could use base image 210 in combination with synthetic incremental backup 1-3 and incremental backups 4-6. Another chain could use base image 210 and the combination of synthetic incremental backup 1-3, synthetic incremental backup 4-5, and incremental backup 6. Still another chain could use base image 210 in combination with synthetic incremental backup 1-5 and incremental backups 6. Those of ordinary skill in the art will recognize that many other combinations of incremental backups and synthetic incremental backups may be used.

Figure 5:
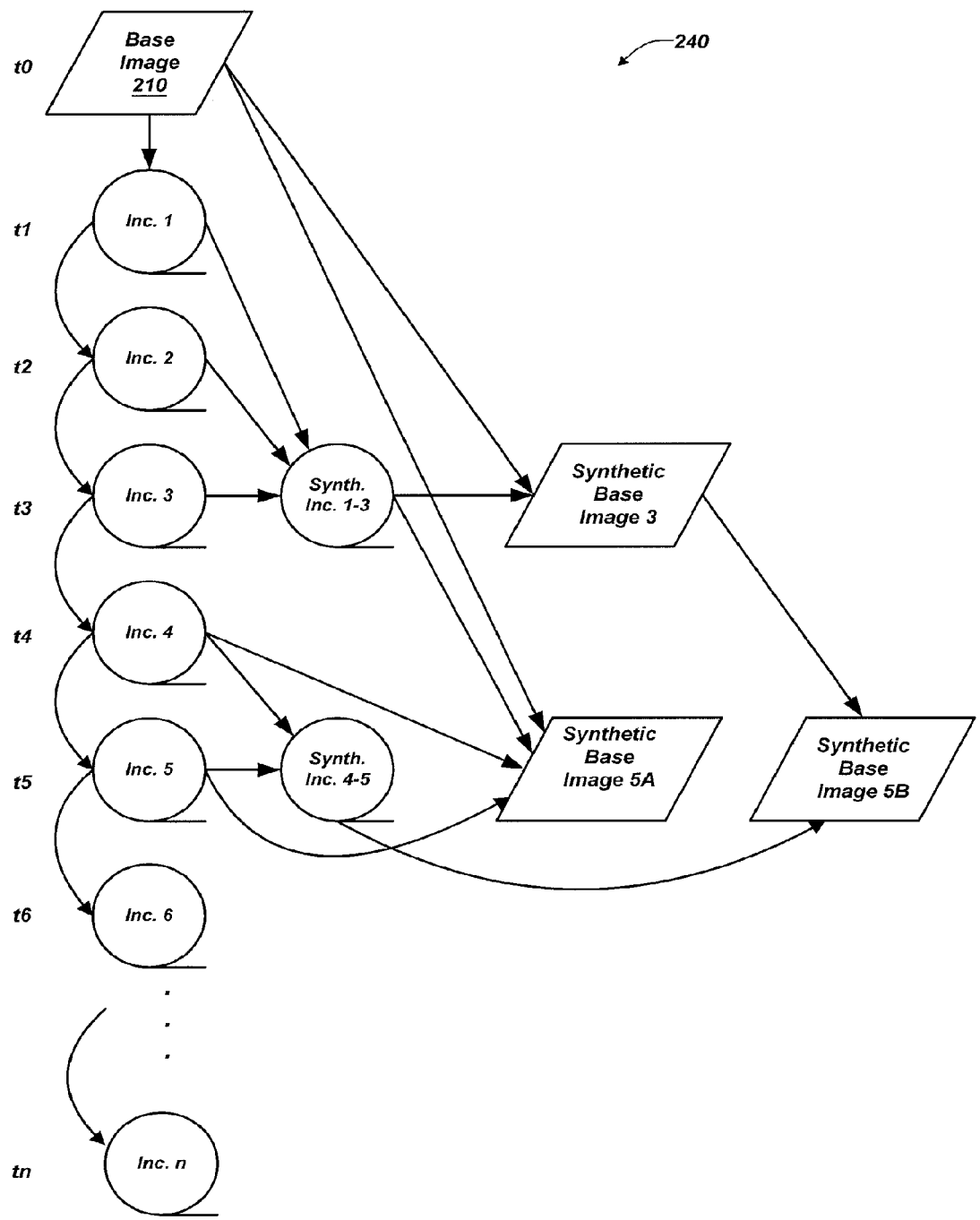
FIG. 5 is a simplified flow diagram illustrating backup procedures for creating synthetic incremental backups and synthetic base backups of a target volume.

FIG. 5 is a flow diagram illustrating backup procedures 240 for creating synthetic incremental backups and synthetic base backups of a target volume. The process of creating synthetic incremental backups may be combined with the process to create synthetic base images to reduce processing time and allow for more granularity in accessing base images. As with FIGS. 3 and 4, FIG. 5 includes base image 210, incremental backups 1-6, and up to incremental backup N at time t0 through tN. As explained earlier, synthetic incremental backups 1-3 and 4-5 may be created. As a non-limiting example, synthetic base image 3 may be created by combining the information from base image 210 and synthetic incremental backup 1-3. As another non-limiting example, synthetic base image 5A may be created by combining the information from base image 210, synthetic incremental backup 1-3, incremental backup 4, and incremental backup 5. As another option for a base image at time t5, synthetic base image 5B may be created by combining information from synthetic base image 3 and synthetic incremental backup 4-5. Those of ordinary skill in the art will recognize that many other combinations of incremental backups, synthetic incremental backups, and synthetic base images may be used.

Figure 6:
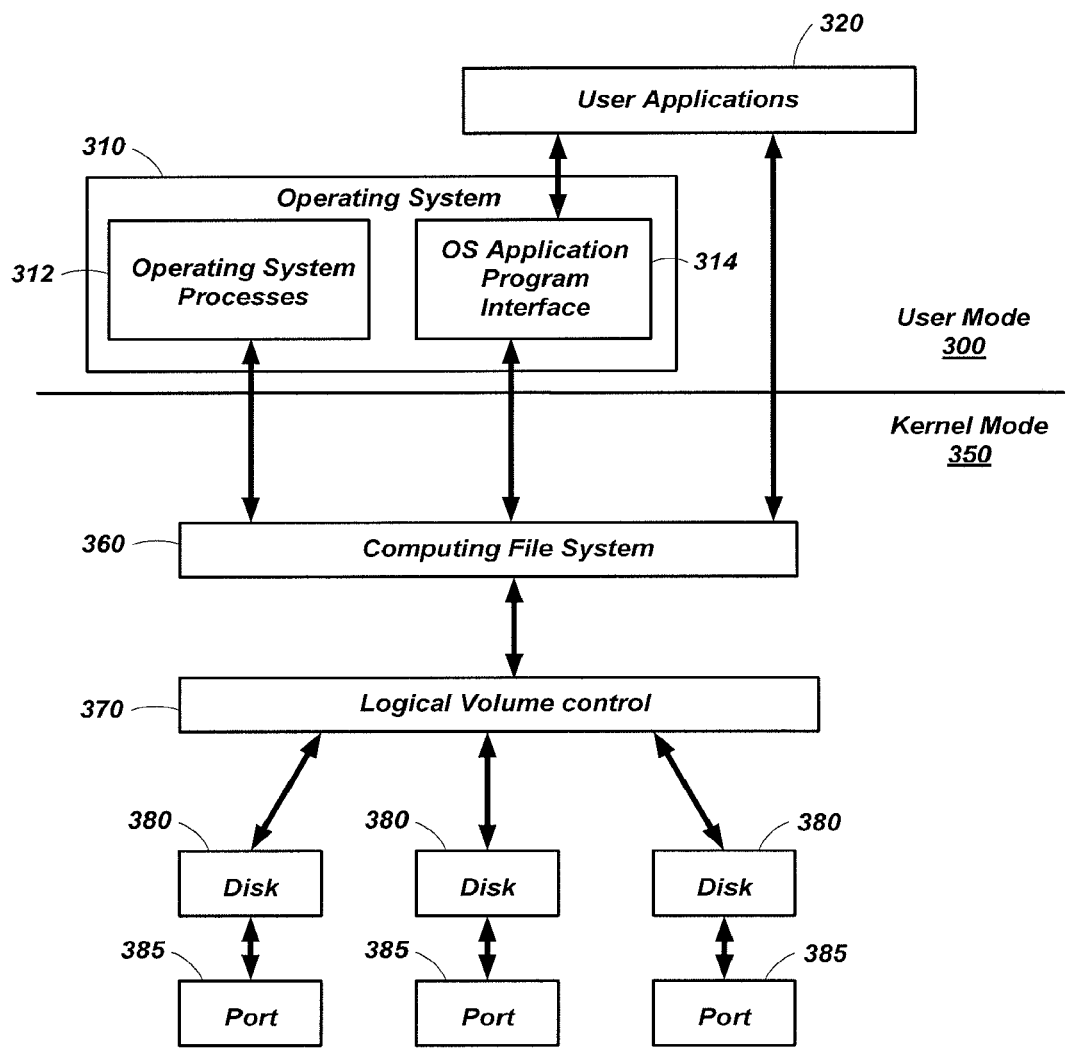
FIG. 6 is a simplified block diagram of a file control stack for an operating system.

FIG. 6 is a simplified block diagram of a file control stack for an operating system. Software organization of a computing system is generally divided between a user mode 300 and a kernel mode 350. The user mode 300 includes many operating system 310 (OS) functions and user applications 320 configured for operation with the operating system 310. The OS 310 may include operating system processes 312 and Application Program Interfaces (APIs) 314 for providing a general interface between user applications 320 and lower level kernel software modules.

The kernel mode 350 includes lower level operating system functions, such as a computing file system 360, logical volume control 370 and device drivers for the various hardware devices in a system. The operating system 310 and user applications 320 may make file Input/Output (I/O) requests in the form of read accesses and write accesses (also referred to as access requests) to the computing file system 360.

The computing file system 360 passes these access requests on to the logical volume control 370 to determine what disk(s) 380, and what sector(s) on the disk(s) 380 should be accessed to perform the access request. Local disk requests are made to a port module 385 that converts the disk request into the necessary hardware controls to retrieve or store the desired data. Of course, as stated earlier, a disk 380 may include multiple logical volumes on different partitions of the disk.

The disks 380 may be a variety of devices, such as magnetic disks, optical disks, solid state disks, Universal Serial Bus (USB) drives, and the like.

Figure 7:
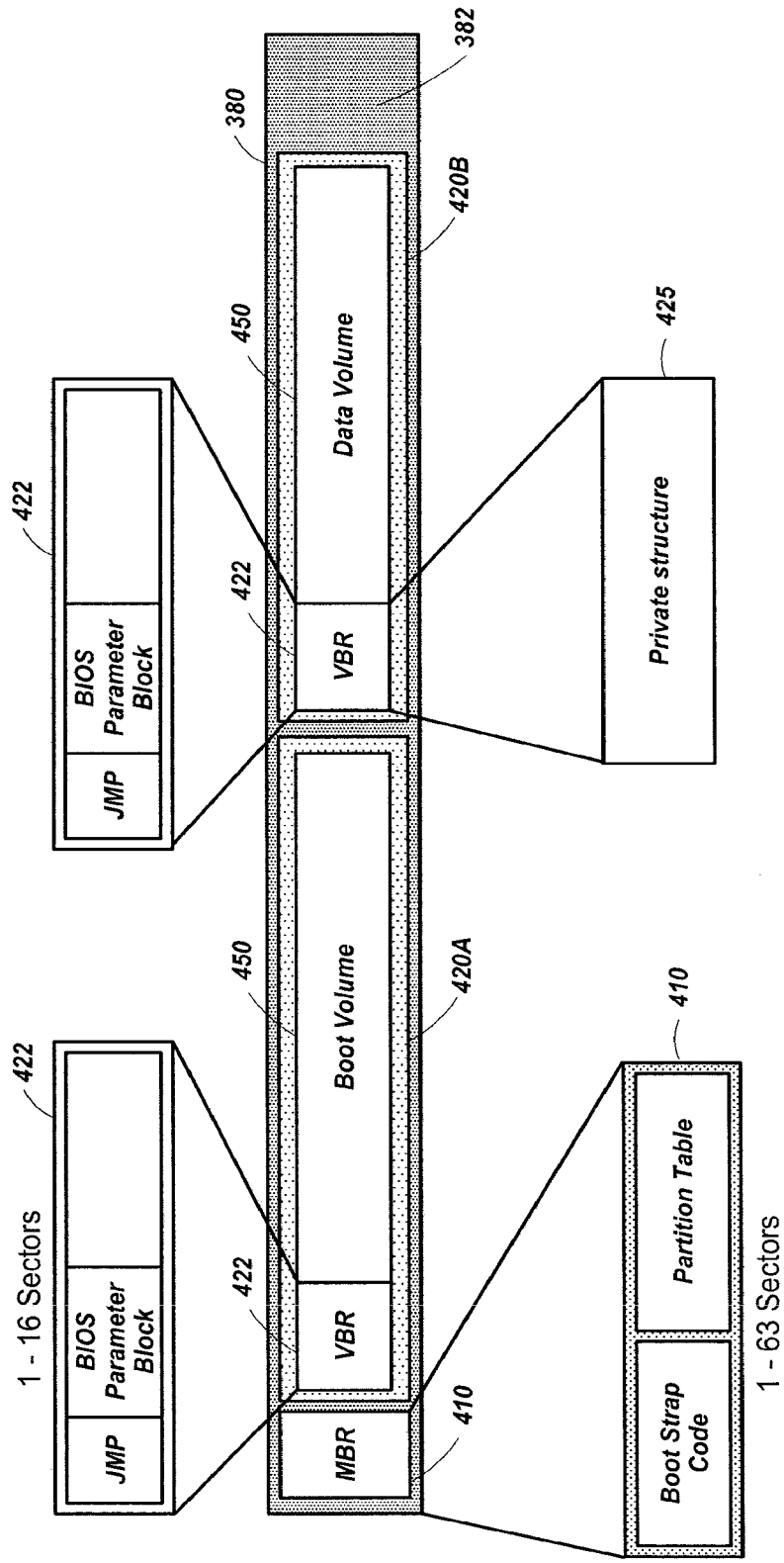
FIG. 7 is a simplified diagram of a disk and control structures thereon.

FIG. 7 is a simplified diagram of an example of one type of disk 380 and control structures thereon. The disk 380 includes a master boot record 410 and one or more partitions, such as, for example, partition 420A, 420B, and unused sector 382. The master boot record (MBR) 410 may include bootstrap code, a partitioning table, and other information related to partitioning of the disk into one or more partitions, volumes, or combinations thereof. Volumes 420A and 420B may be referred to generically herein as 420. For some operating systems, and disk structures, the MBR may be between 1 and 63 sectors on the disk 380 and generally starts at sector 0 of the disk 380. When a computer boots, the OS examines the MBR 410, which includes a jump instruction to another portion of the disk 380 for performing the boot process. The MBR 410 also includes disk layout and partition information so the OS can determine size and location of logical volumes on the disk.

Each volume 420 includes a volume boot record 422 and a data segment 450. The volume boot record 422 of a volume 420 may include a jump instruction to code that may be used in determining information about the volume 420. The volume boot record 422 of a volume 420 may also include a Basic Input Output System (BIOS) parameter block to give details about how to perform input/output operations for the volume 420. The volume boot record 422 also gives information about the volume 420 such as size and file system type, such as, for example, Linux, FAT16, FAT12, FAT32, NTFS, and the like. When an OS recognizes valid information in the volume boot record 422 the OS can mount the volume 420, which makes the data segment 450 available to IO accesses from other OS processes and user applications.

If the volume 420 is an active boot volume 420A, after processing the MBR 410, the OS jumps to the beginning of the volume boot record 422 of the boot volume 420A. The OS uses the jump instruction at the beginning of the volume boot record 422 of the boot volume 420A to jump to a process for completing the boot process and loading of the OS. As part of the process, the OS uses the MBR 410 to find data volumes 420B, determine if they are valid, and mount them if they are valid.

Some embodiments of the present invention may invalidate the volume boot record 422 of a volume 420 and create a private structure 425 for the volume boot record 422. With an invalid volume boot record 422, the OS may still know that the volume 420 is present (using the information in the MBR 410), but it cannot get information about the file system on the volume 420 and will therefore not mount the volume 420. With the volume 420 unmounted, no file accesses to the volume 420 can be made by the standard file system of the OS. As a result, no writes can be made to the volume 420 under normal file access control and writes to the volume 420 may be limited to embodiments of the present invention.

Figure 8:
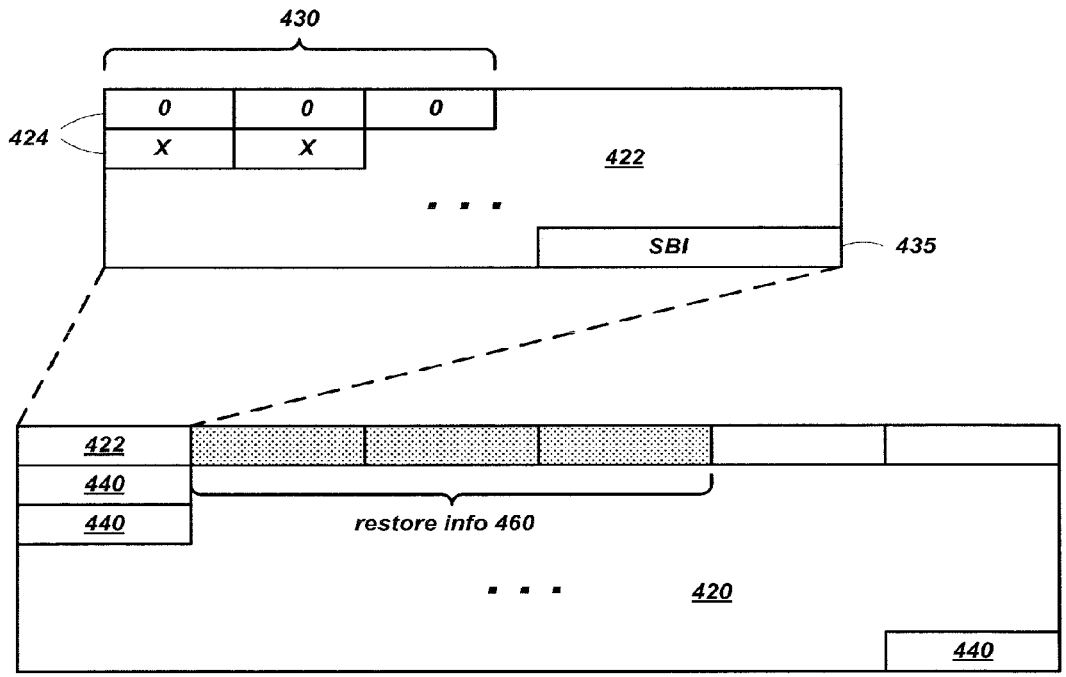
FIG. 8 is a simplified diagram of a restore volume with an invalidated volume boot record.

FIG. 8 is a simplified diagram of a volume 420 (also referred to herein as a restore volume) with an invalidated volume boot record 422 for the private structure 425 (FIG. 7).

The volume 420 is divided up into a number of sectors 440. For simplicity and clarity in the drawings, only some of the sectors are shown and the others are implied as filling in the blank spaces of the volume 420. As shown in the drawings, the volume boot record 422 is illustrated as sector 0 of the volume 420. For most conventional operating systems the volume boot record is defined as sector 0. However, embodiments of the present invention can include the volume boot record 422 as any sector or sectors on the volume 420.

The volume boot record 422 is shown in an exploded view showing various bytes 424 of the volume boot record 422 to show details of the volume boot record 422. A boot segment 430 of the volume boot record 422 includes the information necessary for the OS to recognize the volume 420 as including a valid file system. In FIG. 8, this boot segment 424 is set to all zeros, which invalidates the volume 420 from the perspective of the OS. In other words, the OS may view the volume 420 as an unformatted volume. The volume boot record 422 may include other information useful to the OS, which may or may not be set to zeros, as indicated by the "X" in some of the bytes.

While zeros in the boot segment 430 cause the volume 420 to be unrecognizable to the standard file system of the OS, the volume boot record 422 also includes a special boot identifier (SBI) 435. This special boot identifier 435 can be read by a private block access in a special OS or a special file system within the standard OS as is explained more fully below with reference to FIG. 10. This special access path is generally referred to herein as a private block access. However, other special systems, not necessarily performing a restore operation, may be defined to use the special boot identifier 435 as described herein.

The private block access can read the volume boot record 422 and even though it sees zeros in the volume boot record 422, it can look at another area of the volume boot record 422 in an attempt to find the special boot identifier 435. In the example shown in FIG. 8, the special boot identifier 435 is shown in the last few bytes of the volume boot record 422. Of course, the special boot identifier 435 may be different sizes and at different locations with the volume boot record 422 as long as the private block access knows where to find it within the volume boot record 422. The private block access then knows that the balance of the restore volume 420 is available for a restore process as explained below with reference to FIGS. 11 and 12.

Also shown in FIG. 8 is a restore information block 460. The combination of the special boot identifier 435 and the restore information block 460 comprise a set of restore metadata that may be used by a restore process. The restore metadata may include a variety of information, such as, for example, information related to a restore process for the volume 420.

As a non-limiting example, the restore metadata may include: 1) the special boot identifier 435; 2) a volume identifier; 3) checkpoint information; and 3) a validation block. The special boot identifier 435 has been discussed above.

The volume identifier may be included to indicate for which volume the restore metadata is being used. In volumes where the restore metadata is stored on the volume, the volume identifier is implicit. However, the restore metadata may be stored in a file on another volume, with only a pointer to the restore metadata existing in the special boot identifier. In the case of a file, the volume identifier explicitly identifies which volume the restore metadata is for.

Figure 12:
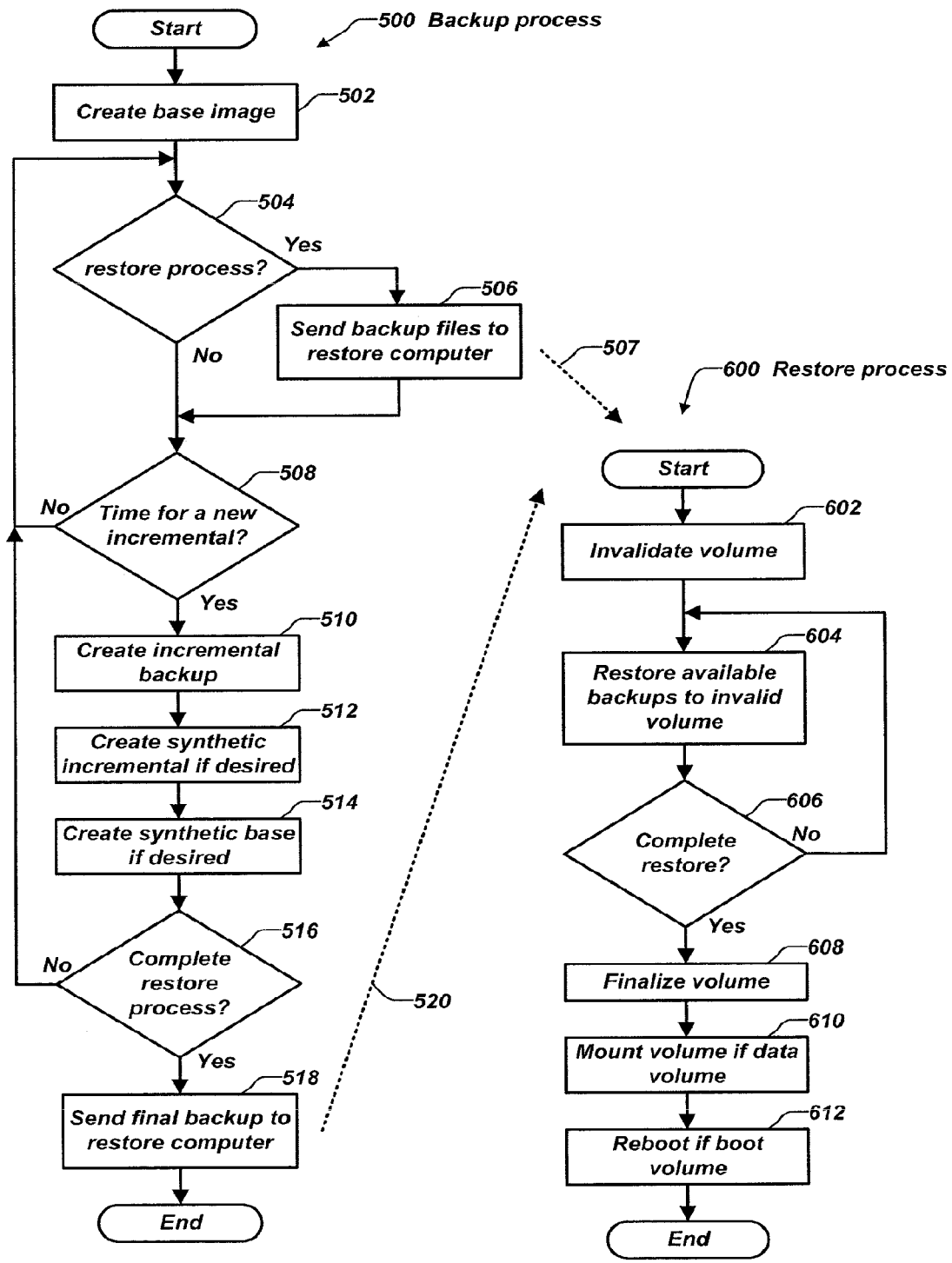
FIG. 12 is simplified flow diagram of a backup and restore process.

The checkpoint information may include various information about where in the restore process the current restore volume is, as will become more apparent from the discussion of the restore process with reference to FIG. 12. Non-limiting examples of checkpoint information include: a most recently applied image file (e.g., point in time, such as base image or incremental backup image), progress within the current image file, time stamps including data and time, bytes within the current image applied so far, and total bytes within the current image.

The validation block may include information to verify that the restore metadata has not been corrupted using, for example, a checksum or a hash function. A hash function provides a small digital "fingerprint" from any kind of data input. By chopping and mixing the original data, the hash algorithm can create a small hash value that is unique to the data run through the hash algorithm. The resulting fingerprint is often called a "hash value." One property of a hash value is that if two hash values generated with the same hash algorithm are different, then the two inputs are different in some way. As a result, a hash function can be used as a checksum such that the relatively small hash value can be used to verify that a data file of any size has not been altered.

Figure 9:
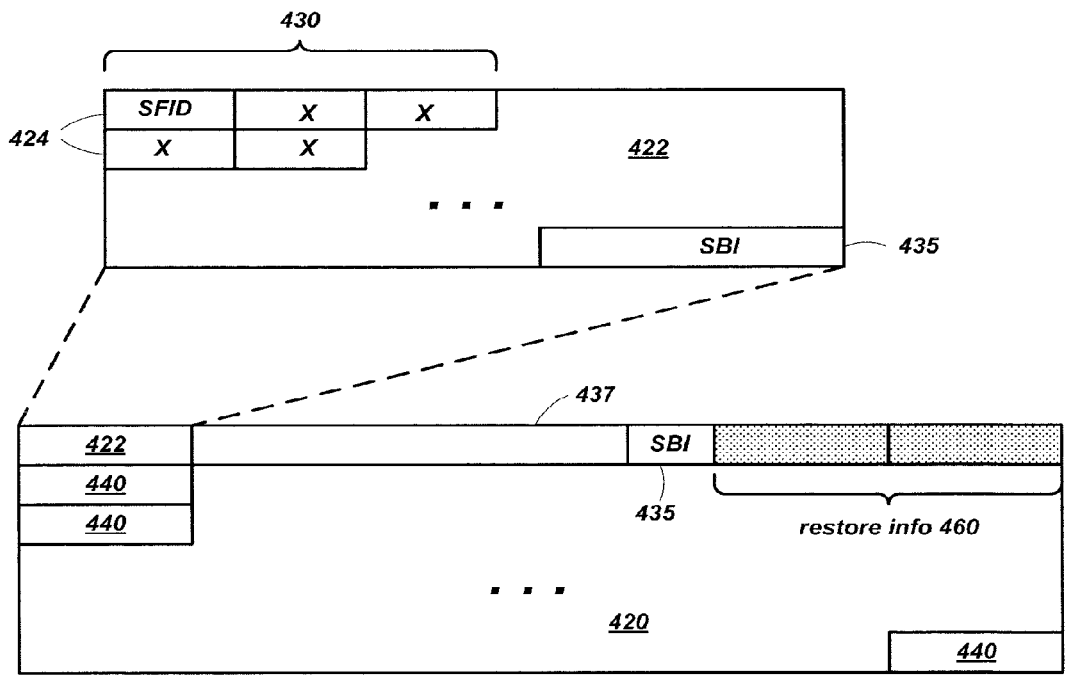
FIG. 9 is a simplified diagram of a restore volume defined with a small file structure thereon.

FIG. 9 is a simplified diagram of a restore volume 420 defined with a small file structure 437 thereon. In some embodiments, rather than invalidating the restore volume 420, the restore volume 420 may be defined as a small file structure (e.g., FAT12) using the proper information for the small file structure 437 as represented in FIG. 9 by the Small File Identifier (SFID). The volume boot record 422 is shown in an exploded view showing various bytes 424 of the volume boot record 422 to show details of the volume boot record 422. A boot segment 430 of the volume boot record 422 includes the information necessary for the OS to recognize the restore volume 420 as a valid volume.

In FIG. 9, this boot segment 430 is set to represent the small file structure 437. Thus, when the OS examines the volume 420, it will determine that the volume is small and, as a result the sectors 440 of the volume 420 not occupied by the small file structure 437 will be inaccessible by the OS and other applications.

However, as with the embodiments of FIG. 8, the volume boot record 422 (or a file within the small file structure) also includes a special boot identifier (SBI) 435. This special boot identifier 435 can be read by a private block access in a special OS or a special file system within the standard OS as is explained more fully below with reference to FIG. 10. This special access path is generally referred to herein as a private block access. However, other special systems, not necessarily performing a restore operation, may be defined to use the special boot identifier 435 as described herein.

The private block access can read the volume boot record 422 and even though it sees a small file structure 437, it can look at another area of the volume boot record 422, or a file on the small file structure, in an attempt to find the special boot identifier 435. In the example shown in FIG. 9, the special boot identifier 435 is shown in the last few bytes of the volume boot record 422 and as a file at the end of the small file structure. Of course, the special boot identifier 435 may be different sizes and at different locations as long as the private block access knows where to find it. The private block access then knows that the balance of the restore volume 420 not taken up by the small file structure 437 is available for a restore process as explained below with reference to FIGS. 11 and 12.

Also shown in FIG. 9 is a restore information block 460. The combination of the special boot identifier 435 and the restore information block 460 comprise a set of restore metadata that may be used by a restore process. The restore metadata may include a variety of information, as explained above with reference to FIG. 8.

Figure 10:
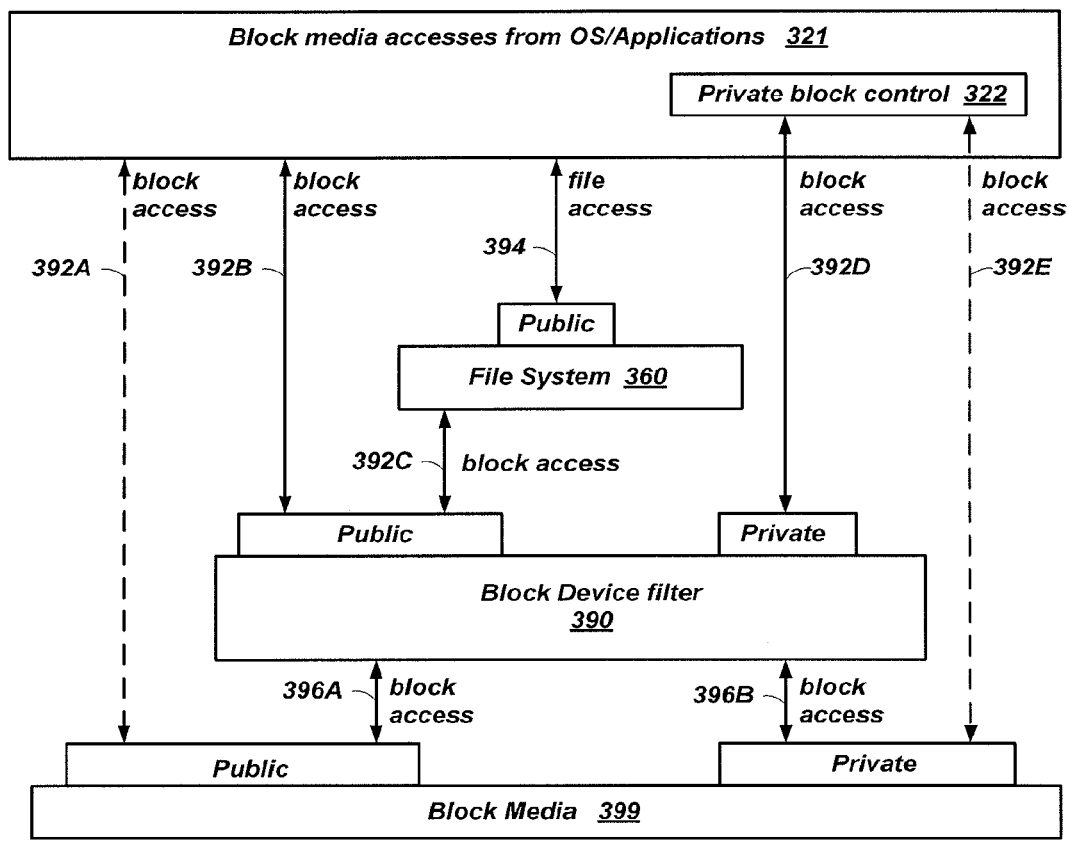
FIG. 10 is a simplified block diagram of a software stack for accessing block media according to embodiments of the present invention.

FIG. 10 is a simplified block diagram of a software stack for accessing block media according to embodiments of the present invention. FIG. 10 illustrates, from a process perspective, block level accesses to block media 399. Block media 399 are generally accessed in block level units. The operating system and applications running on the operating system may perform block media accesses as illustrated by block 321.

Access to block media 399 may be in the form of public accesses, which are generally exposed to applications through software processes within the operating system, file system, or combinations thereof. Accesses to block media may also be through private channels set up by specialized software processes that are not exposed to other applications. These private and public access channels may also be referred to as IO control interfaces (IOCTLs).

The private channels may be set up as a software process operating at an application level to perform direct block access in a manner that is private from other applications by a private block access process 322. The private accesses may also be set up using a software process operating as a block device filter 390 below the file system 360.

Due to these many channels, there may be many ways to access the block media 399. Each of the channels shown in FIG. 10 is discussed below. Operations to block media 399 are generally referred to as accesses and may be understood to include both read and write operations. From a file centric perspective, file accesses 394 are generally considered public. The file system 360 may convert a public file access 394 to one or more public block accesses 392C to access the block media 399 and collect the necessary information to assemble the contents of a file, which is then passed back to the application making the access request.

In some embodiments of the invention, the block device filter 390 may reside below the file system 360 and filter out, or pass through, the public block accesses 392C from the file system 360. If a public block access 392C is allowed to pass through it is presented to the block media 399 as a public block access 396A.

From a block access perspective, an application may directly access block media 399 (in block form rather than file form) through software processes exposed by the operating system as indicated by public block access (392A and 392B). An application may also set up its own private block access process 322 to perform private block access 392D and 392E.

In embodiments that include a block device filter 390, the public block accesses 392B may be blocked, or may be passed on as public block accesses 396A. Similarly, private block accesses 392D may be blocked, or may be passed on as private block accesses 396B. In describing embodiments that use the block device filter 390, public block accesses 392B are performed, rather than public block accesses 392A, because the block device filter 390 can filter all accesses to the block media 399 and public block accesses 392A would not be available. Similarly, private block accesses 392D are performed, rather than private block accesses 392E, because the block device filter 390 can filter all accesses to the block media 399 and private block accesses 392E would not be available.

In embodiments that do not use a block device filter 390, public block accesses 392A and private block accesses 392E are available, whereas public block accesses 392B and private block accesses 392D are not available. Public file accesses 394 will generate block accesses 392C directly (not shown) to the block media 399.

In embodiments that invalidate a volume boot record, as discussed above, a block device filter 390 is not needed, however, some embodiments may use both invalidation of the volume boot record and the block device filter 390 to prevent undesired accesses to the block media 399. Thus, when using an invalidated boot record, a restore process may prevent a restore volume, or a portion thereof, from being recognized by a standard file system by inserting a restore structure in at least a portion of the volume boot record of the restore volume using a block access (392A or 392E), which may be through a public channel 392A or a private channel 392E. The restore structure may be used by the restore process to hold various metadata related to the restore process and at the same time causes the restore volume to be unrecognizable by the file system 360.

After the restore structure is present in the volume boot record of the restore volume, the restore process may use public block accesses 392A or private block accesses 392E to write restore data to restore volume. Normal public file accesses 394 are prevented to the restore volume because the volume boot record is unrecognizable so the restore volume cannot be mounted. After all the restore data is written to the restore volume, the block accesses (392A or 392E) are used to the restore volume to finalize it by restoring the volume boot record to a state indicating that the restore volume is valid.

In embodiments that use a block device filter 390, the volume boot record may not need to be invalidated, however, some embodiments use both invalidation of the volume boot record and the block device filter 390 to prevent undesired accesses to the block media 399. The block device filter 390 prevents public block accesses 392B from applications and public block accesses 392C from reaching the block media 399 as public block accesses 396A. Only private block accesses 392D (passed through the block device filter 390 as private block accesses 396B) and private block accesses 392E are allowed to access the block media 399. Thus, the block media 399 is effectively prevented from being modified, except through the block device filter 390 or private block control 322, which are used by the restore process.

To perform the restore process, the restore volume, or a portion thereof, is prevented from undesired changes by the block device filter 390 preventing public media accesses (e.g., public file accesses 394, public block accesses 392B and public block accesses 392C) to the restore volume and allow private block accesses (392D and 392E) to the restore volume. The restore process may use private block accesses (392D and 392E) to write restore data to the restore volume while the public media accesses (394, 392B, and 392C) are being prevented. After all the restore data is written to the restore volume, the block device filter 390 may be removed or reconfigured to allow public media accesses (394, 392B, and 392C) to finalize the restore volume.

Figure 11:
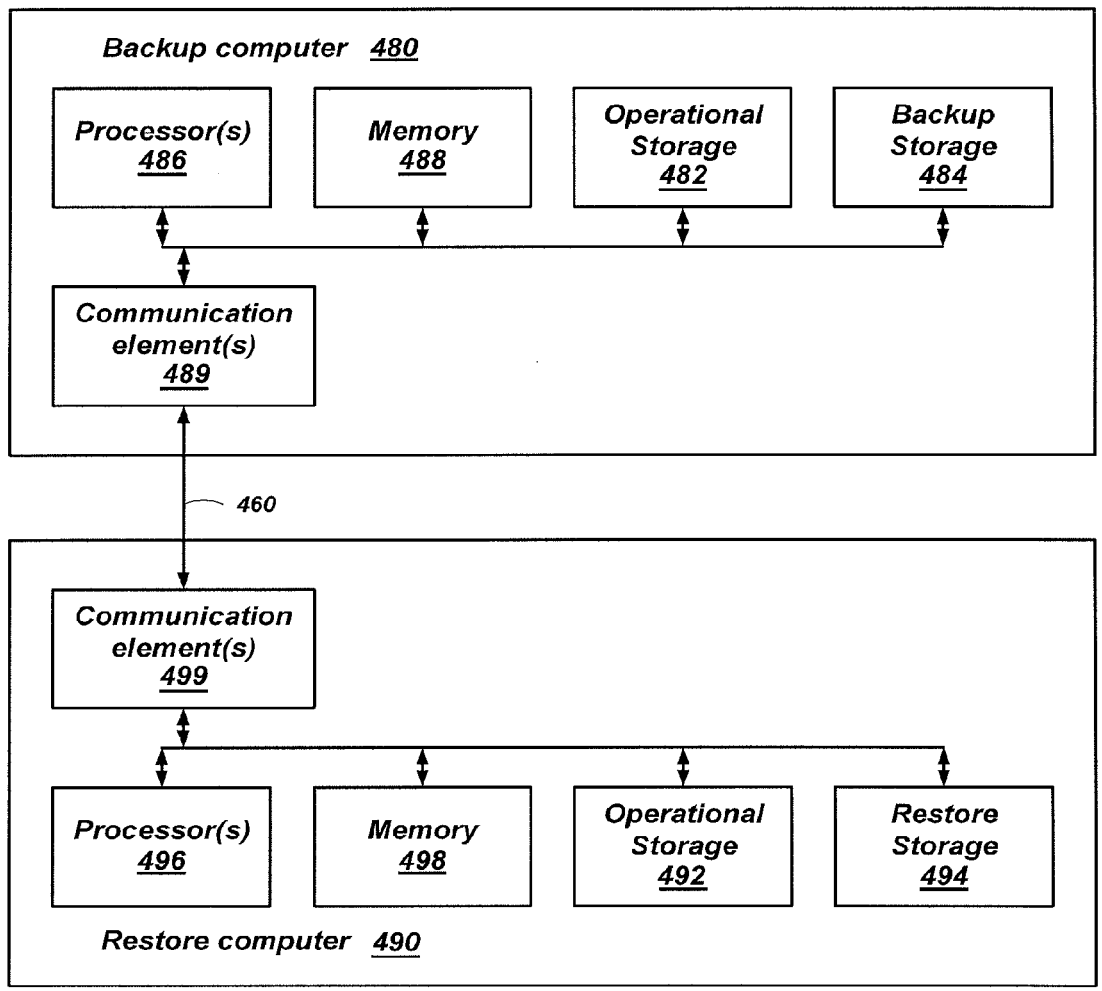
FIG. 11 is a simplified block diagram of a backup and restore system.

FIG. 11 is a simplified block diagram of a backup and restore system. The system illustrates a backup computer 480 with operational storage 482 and backup storage 484 controlled by one or more processors 486, memory 488, and communication elements 489. A restore computer 490 includes operational storage 492 and restore storage 494 controlled by one or more processors 496, memory 498, and communication elements 499. In embodiments of the disclosure the backup computer 480 and the restore computer 490 may be physically near each other or may be in vastly different physical locations. In addition, in some embodiments, the backup computer 480 and restore computer 490 may be the same computer with backup storage 484, operational storage 482, and restore storage 494. In such embodiments, it will be understood that the processes described herein as occurring on two different computers may all occur on the same computer.

Backup images may be communicated between the backup computer 480 and the restore computer 490 via a communication link 460. This communication may be accomplished in a number of ways. As non-limiting examples, the backup images may be communicated electronically across a wide-area network (WAN) or a local-area network (LAN).

As stated earlier, base images may be quite large. Therefore, as other non-limiting communication examples, the base image, incremental images, and combinations thereof may be placed on media such as a magnetic media or an optical media and physically transported by any appropriate transportation element from the local site to the remote site. Furthermore, prior to communication (either electronically or by transport), the base image may be compressed to reduce the size of the image or encrypted for security.

As mentioned earlier performing a restore process when a computer has failed may be an extremely long process when terabytes of data are involved. In addition, when migrating data from one computer to another (e.g., in an upgrade) it may be difficult to have both the old computer and the upgrade computer down for the entire time required to perform a restore process.

In conventional restore systems, a final backup would need to be made on the old computer and then access to that old computer prevented so that the new computer can be restored to a same and coherent state with the old computer. Thus, conventionally, restore processes have been performed over night or on weekends to minimize the impact of down time on the users. For example, a server with terabytes of data may take 18 to 24 hours (or even longer) to restore if the restore process can restore 1 GB per minute. In addition, restore processes are generally not completely automated and must be monitored by a system administrator. If any problems with the restore occur, the entire restore process may need to be started from the beginning, creating even more down time.

Embodiments of the present invention use the invalidated volumes discussed above to perform a headstart restore process, wherein a restore may begin on a new machine while the old machine is still operating in its normal mode performing its usual functions and incremental backup functions as explained above.

By marking a volume as invalid to the operating system, the OS and user applications cannot modify that volume. However, a private block access operating separate from or in combination with the OS can recognize the invalid volume and begin restoring backup files from the old computer on the new computer while the old computer is still running.

The restore process can continue with incremental backups until the new computer is restored to the same state as the old computer was at the last incremental backup. Then, a final incremental backup can be performed on the old computer and the old computer is shut down to prevent any further changes. Then, only the final incremental backup needs to be restored on the new computer and the invalidated volume can be finalized and exposed to the operating system.

FIG. 12 is simplified flow diagram of a process for restoring data including a backup process 500 and a restore process 600. As mentioned earlier, the backup process may be performed on a backup computer 480 (FIG. 11) and the restore process may be performed on a restore computer 490. Alternatively, the backup process and restore process may be performed on a single computer. In addition, both the backup process 500 and the restore process 600, except where noted, may be performed in the background and concurrently, such that the respective computers can continue on with their normal operations.

In operation 502 of the backup process 500, a base image of the volume to be backed up is created. Decision block 504 determines if a restore process should be started on this or another computer. If so, operation 506 sends 507 any backup files that have not yet been sent to the computer performing the restore process 600. If it is the same computer, the sending may simply be pointers to the backup files. If no incremental images have been created, only the base image would be sent. On subsequent cycles through the loop of backup process 500 incremental images may be sent from the backup process 500 to the restore process 600 as they become available.

Decision block 508 tests to see if it is time to create a new incremental backup at a new point in time. If not, the backup process 500 loops back to decision block 504. If it is time for a new incremental backup, operation 510 performs the incremental backup.

Operation block 512 creates a synthetic incremental backup if desired and as discussed above with reference to FIGS. 2-5. Operation block 514 creates a synthetic base backup if desired and as discussed above with reference to FIGS. 2-5.

Decision block 516 tests to see if completion of a restore process is desired. In the case of a migration, this test may occur at any user-defined time based on when it may be convenient to have both the backup computer and restore computer unavailable while a final incremental backup is restored. In the case of a catastrophic failure, that failure would prompt the decision to complete the restore process.

If a completion of the restore process is not desired, the backup process 500 loops back to decision block 504. If a completion of the restore process is desired, operation 518 sends 520 the final backup to the restore process 600. Of course, in the case of a catastrophic failure, the final backup may not be made and the last completed incremental would have to be used as the restore point. After a final incremental is sent, the backup process ends.

The restore process 600 may begin concurrently with the backup process 500 any time after the base image has been received by the restore process 600. To begin, operation 602 invalidates the volume to be restored as discussed above with reference to FIGS. 7-10. As stated above, since the volume is inaccessible and unrecognized by the standard file system, the volume may be a boot volume or a data volume. Operation 604 copies the available backup images that have been sent from the backup process 500 to the invalidated volume. Decision block 606 tests to see if it is time to complete the restore process 600. As stated above, this may be a user selected time or a forced time due to a catastrophic failure. If the restore is not to be completed at this time, the restore process 600 loops to operation 604 to restore more backup images if they are available. If the restore is to be completed, operation 608 finalizes the volume to make it recognizable by the standard file system.

Optionally, operation 610 may mount the restored volume so that the standard file system can access it. Optionally, operation 612 may reboot the system if the restored volume is a boot volume. Upon rebooting, the MBR may point to a now valid volume boot record on the newly restored boot volume so the system can boot up from the restored boot volume.

Alternatively, operations 608, 610, and 612 may be postponed. As a non-limiting example, the restore system may have multiple volumes that need to be restored. It may be desirable to wait until all the volumes have been restored before exposing the restored volumes to the standard file system, mounting the volumes, or a combination thereof.

In many modern systems a disk, a volume, or a combination thereof may be virtually represented by a file that appears to the system (through APIs or other means) as a conventional physical volume. Embodiments of the present invention may be used on such virtual volumes as explained above. In addition, the file that emulates the virtual volume may be write protected or hidden from the standard file system as a way to invalidate the virtual volume from the perspective of the standard file system.

Figure 13:
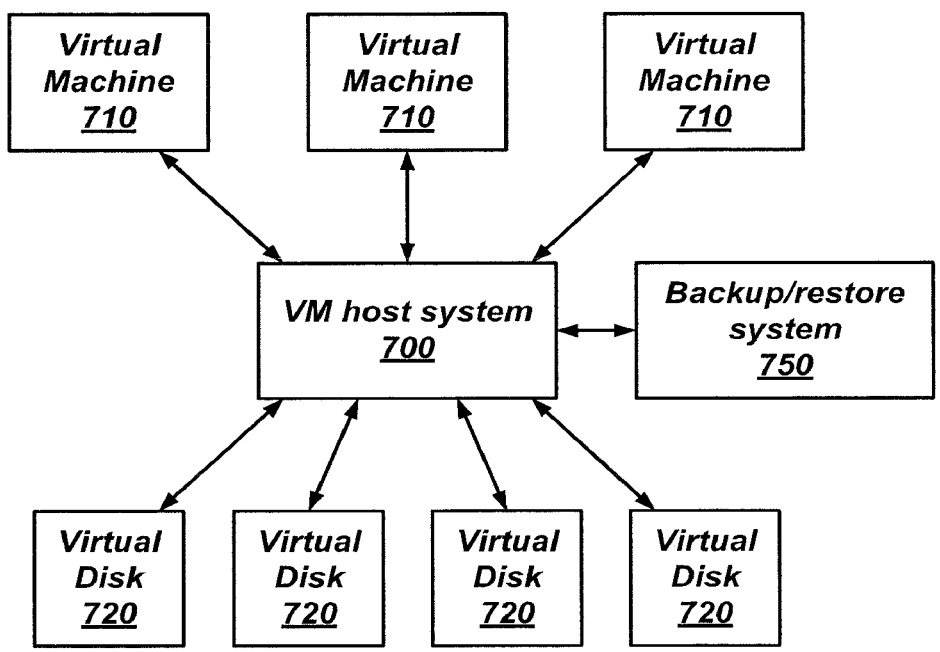
FIG. 13 is a simplified block diagram of a virtual machine using virtual disks.

FIG. 13 illustrates one non-limiting example for using virtual disks by using them in a virtual machine (VM) host system 700. Multiple virtual machines 710 may run as processes on the VM host system 700. Through the VM host system 700, these virtual machines 710 may have access to one or more virtual disks 720 (and virtual volumes). The VM host system 700 may maintain these virtual disks 720 as files for the VM host system 700, but they would appear as volumes to the virtual machines 710. A backup and restore system 750 running alongside, or within, the VM host system would be able to read, write, and invalidate the virtual disks 720 to perform restore processes as discussed above simply by locking or hiding the file representing the virtual disk 720.

Of course, the backup and restore processes may also operate as discussed above with reference FIGS. 7-10 by operating within one of the virtual machines 710 to access the virtual disks 720.

Although this invention has been described with reference to particular embodiments, the invention is not limited to these described embodiments. Rather, the invention is limited only by the appended claims, which include within their scope all equivalent devices or methods that operate according to the principles of the invention as described.

The invention claimed is:

1. A method for restoration of a backup of a first volume to a second volume on physical media, the method comprising:
   accessing a volume boot record of the second volume while the volume boot record is in a valid state on the physical media, the valid state enabling a standard operating system to access a data segment of the second volume;
   modifying the volume boot record to place the volume boot record into an invalid state on the physical media, the invalid state preventing the standard operating system from accessing at least a portion of the data segment of the second volume;
   while the volume boot record is in the invalid state, writing data from the backup of the first volume to the inaccessible portion of the data segment of the second volume; and
   restoring the volume boot record to the valid state.

2. The method of claim 1, wherein:
   the method further comprises creating the backup of the first volume;
   the backup of the first volume includes a base backup of the first volume and an incremental backup of the first volume; and
   at least a portion of the incremental backup is created after the data from the base backup has been written to the inaccessible portion of the data segment of the second volume.

3. The method of claim 1, wherein the modifying the volume boot record includes modifying a signature portion of the volume boot record.

4. The method of claim 1, wherein the modifying the volume boot record includes modifying the volume boot record to represent a file structure with a capacity less than an actual capacity of the second volume.

5. The method of claim 1, wherein the modifying the volume boot record includes inserting status data into the volume boot record and periodically updating the status data, the status data indicating a status of the writing the data from the backup.

6. One or more non-transitory computer-readable media storing one or more programs that are configured, when executed, to cause one or more processors to execute the method as recited in claim 1.

7. A method for restoration of an image backup of a first volume to a second volume on physical media, the method comprising:
   accessing a volume boot record of the second volume while the volume boot record is in a valid state on the physical media, the second volume being divided between a file system metadata segment and a data segment that is separate from the file system metadata segment, the file system metadata segment configured to store blocks of file system metadata, the data segment configured to store blocks of file content, the valid state enabling a standard operating system to access the data segment of the second volume;
   modifying the volume boot record to place the volume boot record into an invalid state on the physical media, the invalid state preventing the standard operating system from accessing at least a portion of the data segment of the second volume;
   while the volume boot record is in the invalid state, writing blocks from the image backup of the first volume to the inaccessible portion of the data segment of the second volume; and
   restoring the volume boot record to the valid state.

8. The method of claim 7, wherein:
   the method further comprises creating the image backup of the first volume;
   the image backup of the first volume includes a base image backup of the first volume and an incremental image backup of the first volume; and
   at least a portion of the incremental image backup is created after blocks from the base image backup have been written to the inaccessible portion of the data segment of the second volume.

9. The method of claim 7, wherein the modifying the volume boot record includes modifying a signature portion of the volume boot record.

10. The method of claim 7, wherein the modifying the volume boot record includes modifying the volume boot record to represent a file structure with a capacity less than an actual capacity of the second volume.

11. The method of claim 7, wherein the modifying the volume boot record includes inserting status data into the volume boot record and periodically updating the status data, the status data indicating a status of the writing the blocks from the image backup.

12. The method of claim 7, wherein the modifying the volume boot record and the writing the blocks from the image backup are accomplished using private block accesses.

13. One or more non-transitory computer-readable media storing one or more programs that are configured, when executed, to cause one or more processors to execute the method as recited in claim 7.

14. A method for restoration of an image backup of a first volume to a second volume on physical media, the method comprising:
   creating a base image backup of the first volume;
   accessing a volume boot record of the second volume while the volume boot record is in a valid state on the physical media, the second volume being divided between a file system metadata segment and a data segment that is separate from the file system metadata segment, the file system metadata segment configured to store blocks of file system metadata, the data segment configured to store blocks of file content, the valid state enabling a standard operating system to access the data segment of the second volume;
   after the creating the base image backup, modifying the volume boot record to place the volume boot record into an invalid state on the physical media, the invalid state preventing the standard operating system from accessing at least a portion of the data segment of the second volume;
   while the volume boot record is in the invalid state, writing blocks from the base image backup of the first volume to the inaccessible portion of the data segment of the second volume;
   while the volume boot record is in the invalid state, creating an incremental image backup of the first volume;
   while the volume boot record is in the invalid state, writing blocks from the incremental image backup of the first volume to the inaccessible portion of the data segment of the second volume; and
   restoring the volume boot record to the valid state.

15. The method of claim 14, wherein the creating the incremental image backup is performed after the writing the blocks from the base image backup.

16. The method of claim 14, wherein the modifying the volume boot record includes zeroing at least a portion of volume boot record.

17. The method of claim 14, wherein the modifying the volume boot record includes modifying the volume boot record to represent a file structure with a capacity less than an actual capacity of the second volume.

18. The method of claim 14, wherein the modifying the volume boot record includes inserting status data into the volume boot record and periodically updating the status data, the status data indicating a status of the writing the blocks from the base image backup and of the writing the blocks from the incremental image backup.

19. The method of claim 14, wherein the modifying the volume boot record, the writing the blocks from the base image backup, and the writing the blocks from the incremental image backup are accomplished using private block accesses.

20. One or more non-transitory computer-readable media storing one or more programs that are configured, when executed, to cause one or more processors to execute the method as recited in claim 14.

* * * * *